(12) United States Patent
Shabbir (10) Patent No.: US 11,460,423 B2
(45) Date of Patent: Oct. 4, 2022

(54) SYSTEM AND METHOD TO CREATE AN AIR FLOW MAP AND DETECT AIR RECIRCULATION IN AN INFORMATION HANDLING SYSTEM

(71) Applicant: DELL PRODUCTS, LP, Round Rock, TX (US)

(72) Inventor: Hasnain Shabbir, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 403 days.

(21) Appl. No.: 16/800,431

(22) Filed: Feb. 25, 2020

(65) Prior Publication Data

US 2021/0262958 A1 Aug. 26, 2021

(51) Int. Cl.
| | |
|---|---|
| G06F 1/00 | (2006.01) |
| G01N 25/18 | (2006.01) |
| G06F 1/28 | (2006.01) |
| G06F 1/20 | (2006.01) |

(52) U.S. Cl.
CPC ............ *G01N 25/18* (2013.01); *G06F 1/206* (2013.01); *G06F 1/28* (2013.01)

(58) Field of Classification Search
CPC ............ G06F 1/206; G06F 1/28; G06N 25/18
See application file for complete search history.

(56) References Cited

U.S. PATENT DOCUMENTS

| | | | |
|---|---|---|---|
| 6,491,426 B1* | 12/2002 | Schonath | G01N 25/18 374/45 |
| 2009/0132834 A1 | 5/2009 | Chaudhry et al. | |
| 2009/0281761 A1* | 11/2009 | Bandholz | G06F 11/30 702/132 |
| 2014/0245032 A1* | 8/2014 | Vadakkanmaruveedu | G06F 1/3296 713/300 |
| 2014/0278333 A1 | 9/2014 | Gupta et al. | |

* cited by examiner

*Primary Examiner* — Nitin C Patel
(74) *Attorney, Agent, or Firm* — Larson Newman, LLP (57) ABSTRACT

An information handling system includes a memory module having a first temperature sensor collocated with first memory devices associated with a first memory channel, and a second temperature sensor collocated with second memory devices associated with a second memory channel. A processor receives a first temperature from the first temperature sensor and a second temperature from the second temperature sensor, receives a first power level associated with the first memory channel and a second power level associated with the second memory channel from the memory module, determines a first thermal resistance of the first memory devices based upon the first temperature and the first power level, and determines a second thermal resistance of the second memory device based upon the second temperature and the second power level.

20 Claims, 6 Drawing Sheets

SYSTEM AND METHOD TO CREATE AN AIR FLOW MAP AND DETECT AIR RECIRCULATION IN AN INFORMATION HANDLING SYSTEM

FIELD OF THE DISCLOSURE

This disclosure generally relates to information handling systems, and more particularly relates to creating an air flow map and detecting air recirculation in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a memory module having a first temperature sensor collocated with first memory devices associated with a first memory channel, and a second temperature sensor collocated with second memory devices associated with a second memory channel. A processor may receive a first temperature from the first temperature sensor and a second temperature from the second temperature sensor, receive a first power level associated with the first memory channel and a second power level associated with the second memory channel from the memory module, calculate a first thermal resistance of the first memory devices based upon the first temperature and the first power level, and calculate a second thermal resistance of the second memory device based upon the second temperature and the second power level

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
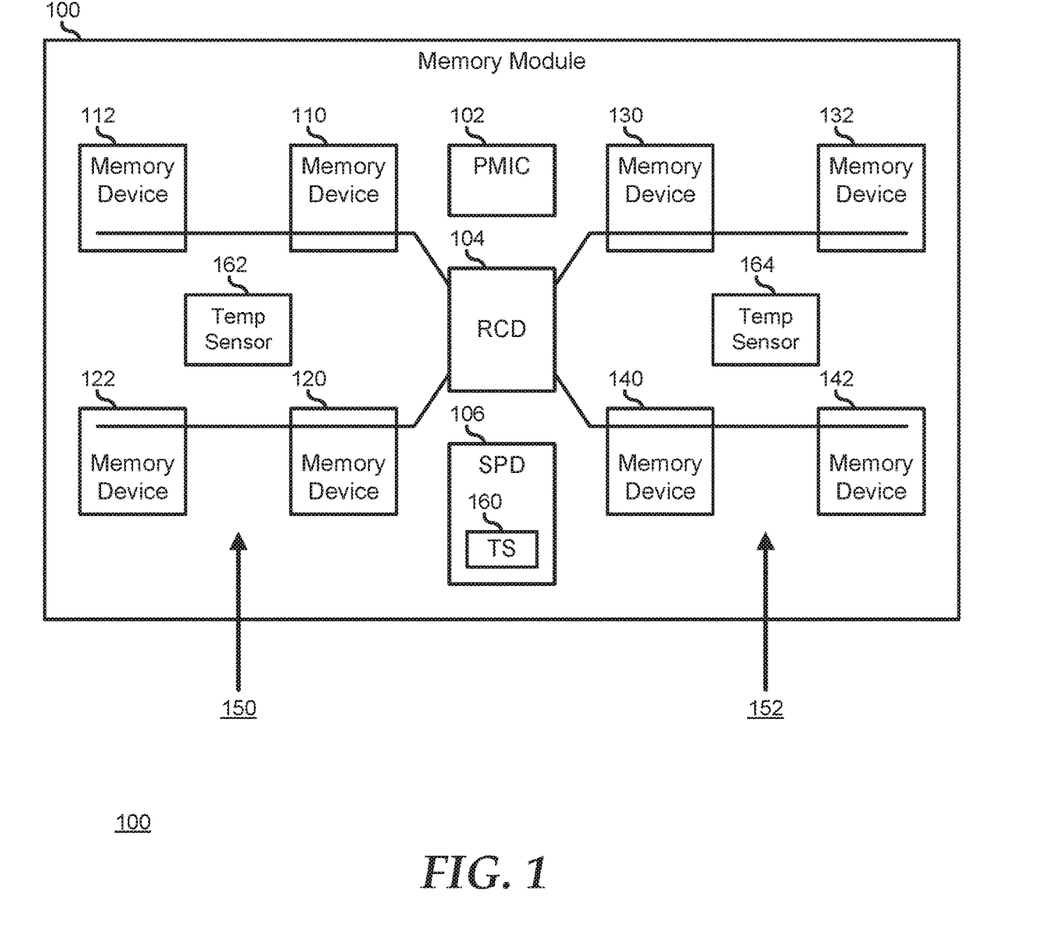
FIG. 1 is a block diagram illustrating a memory module according to an embodiment of the present disclosure.

FIG. 1 illustrates a memory module 100 according to at least one embodiment of the disclosure. Memory module 100 includes a power management integrated circuit (PMIC) 102, a registering clock driver RCD 104, and an electronically erasable programmable read only memory (EEPROM) serial presence detect (SPD) hub 106. Memory module 100 also includes multiple memory devices including, but not limited to, dynamic random access memories (DRAMs) and non-volatile random access memories (NVRAMs), divided into different memory channels and memory ranks. For example, memory devices 110 and 112 (110-112) may be assigned or arranged into a first memory rank of a memory channel 150, and memory devices 120 and 122 (120-122) may be assigned or arranged into a second memory rank of the memory channel 150. Similarly, memory devices 130 and 132 (130-132) may be assigned or arranged into a first memory rank of a memory channel 152, and memory devices 140 and 142 (140-142) may be assigned or arranged into a second memory rank of the memory channel 152.

Memory module 100 includes multiple temperature sensors including, but not limited to, a temperature sensor 160 within SPD hub 106, a temperature sensor 162 located in the middle of memory channel 150, and a temperature sensor 164 located in the middle of memory channel 152. Memory module 100 may include additional temperature sensors without varying from the scope of this disclosure, such as individual temperature sensors in each of memory devices 110, 112, 120, 122, 130, 132, 140, and 142, and a temperature sensor in PMIC 102. Temperature sensors 160, 162, and 164 operate to provide thermal telemetry data, including the ambient temperature at the location of each of the temperature sensors. The thermal telemetry data may include other information, such as a temperature history at the location of the associated temperature sensor, a temperature threshold for the location, a number of times the temperature threshold has been exceeded, or other information, as needed or desired. The thermal telemetry data may be obtained from temperature sensors 160, 162, and 164 via a side-band communication interface of memory module 100, such as an I3C interface, a Serial Presence Interface (SPI), or another side-band interface of the memory module, as needed or desired.

Figure 2:
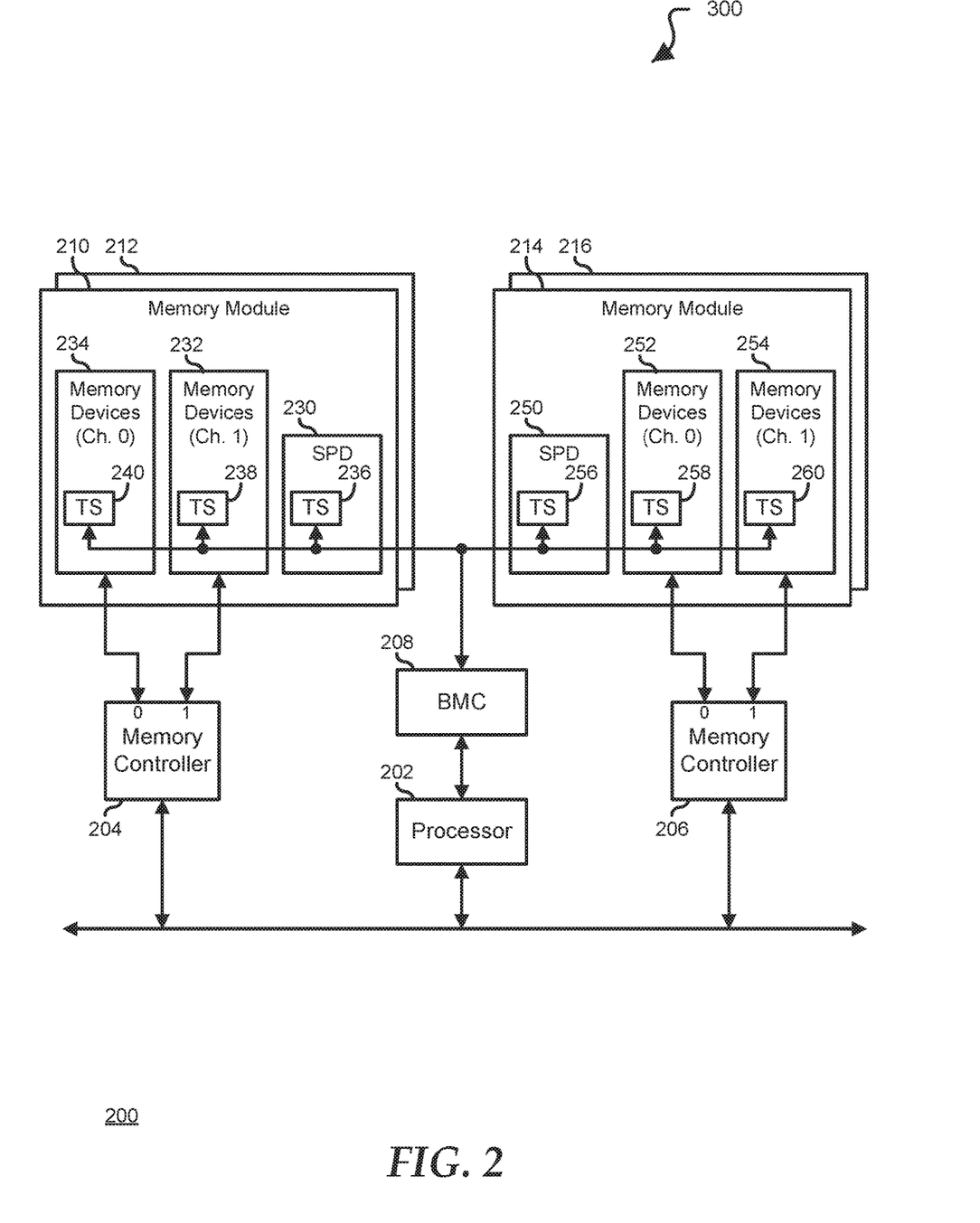
FIG. 2 is a block diagram of an information handling system utilizing the memory module of FIG. 1.

FIG. 2 illustrates an information handling system 200 including a processor 202, memory controllers 204 and 206, a BMC 208, and memory modules 210, 212, 214, and 216 (210-216). Memory modules 210-216 are each similar to memory module 100. Memory module 210 includes an SPD hub 230 and memory devices 232 and 234. Memory devices 232 and 234 are connected via separate memory channels to memory controller 204. While not illustrated herein, memory module 212 includes an SPD hub similar to SPD hub 230, and memory devices similar to memory devices 232 and 234, and that the memory devices are each connected to one of the two memory channels to memory controller 204. Similarly, memory module 214 includes an SPD hub 250 and memory devices 252 and 254. Memory devices 252 and 254 are connected via separate memory channels to memory controller 206. Memory module 216 includes an SPD hub similar to SPD hub 250, and memory devices similar to memory devices 252 and 254, and the memory devices are each connected to one of the two memory channels to memory controller 206. Memory controllers 204 and 206 are each connected to processor 202 via a high-speed data link. For example, memory controllers 204 and 206 may be connected by a multi-lane PCIe link, such as a x8 PCIe link, a x16 PCIe link, or the like, or the memory controllers may be integrated with the processor and the high-speed data link may be a data link internal to the processor, as needed or desired.

SPD hub 230 includes a temperature sensor 236, memory devices 232 include a temperature sensor 238, and memory devices 234 include a temperature sensor 240. Temperature sensors 236, 238, and 240 are each connected to BMC 208 via, for example, an I3C interface to provide thermal telemetry data to the BMC. While not illustrated herein, it will be understood that the SPD hub and memory channels of memory module 212 each include temperature sensors that are connected to BMC 208 to provide thermal telemetry data to the BMC. Similarly, SPD hub 250 includes a temperature sensor 256, memory devices 252 include a temperature sensor 258, and memory devices 254 include a temperature sensor 260. Temperature sensors 256, 258, and 260 are each connected to BMC 208 via, for example, an I3C interface to provide thermal telemetry data to the BMC. It will be further understood that the SPD hub and memory channels of memory module 216 each include temperature sensors that are connected to BMC 208 to provide thermal telemetry data to the BMC. BMC 208 is connected to processor 202 via one or more interfaces, including a Low Pin Count (LPC) interface, an Inter-Integrated-Circuit (I2C) interface, an I3C interface, a PCIe interface, or the like. An example of BMC 208 may include a commercially available BMC product or other device that operates in accordance with an Intelligent Platform Management Initiative (IPMI) specification, such as an Integrated Dell Remote Access Controller (iDRAC), an Embedded Controller (EC), or the like.

In operation, thermal telemetry data from temperature sensors 236, 238, 240, 256, 258, and 260, and the temperature sensors of memory modules 212 and 216 is provided to BMC 208. For example, BMC 208 may receive the thermal telemetry data from temperature sensors 236, 238, 240, 256, 258, and 260, and the temperature sensors of memory modules 212 and 216 via a side-band communication bus, such as I3C communication bus. Here, BMC 208 may operate to provide the thermal telemetry data to processor 202. In a particular embodiment, the thermal telemetry data is utilized to improve information handling system 200 by creating a memory air flow map for the information handling system and detecting and correcting air flow recirculation within the information handling system.

The inventors of the present disclosure have understood that the air flows over the various components of an information handling system, such as server systems, are typically estimated based upon the system configuration and the layout of the components within the information handling system. In particular, a manufacturer of an information handling system may typically characterize the air flows in a particular design using multiple airflow and temperature sensors placed within various fan sections on the information handling system. Information gathered during the characterization may then be utilized to tune the performance of the fans in the information handling system based upon a relatively fewer number of airflow and temperature sensors that are available within the production information handling system. In particular, the BMC of the information handling system may implement various fan speed vs. air flow vs. temperature tables to set the speed of one or more fans in the information handling system to optimize the performance of the information handling system. However, such characterization activities and the resulting fan speed vs. air flow vs. temperature tables may fail to adequately optimize the performance of the information handling system due to differences between the actual operating data gathered during run time and the characterization data gathered based upon the design. In particular, a common problem experienced by high density servers deployed in racks in a datacenter is a potential risk of hot aisle backpressure resulting in airflow recirculation in the servers. That is, the fans for a particular fan zone may not be providing sufficient airflow to ensure that the airflow in the particular fan zone does not reverse direction. Such recirculation may result in significant cooling inefficiency and early detection and mitigation can prevent such inefficiencies and potential thermal failures in the affected servers.

Figure 3:
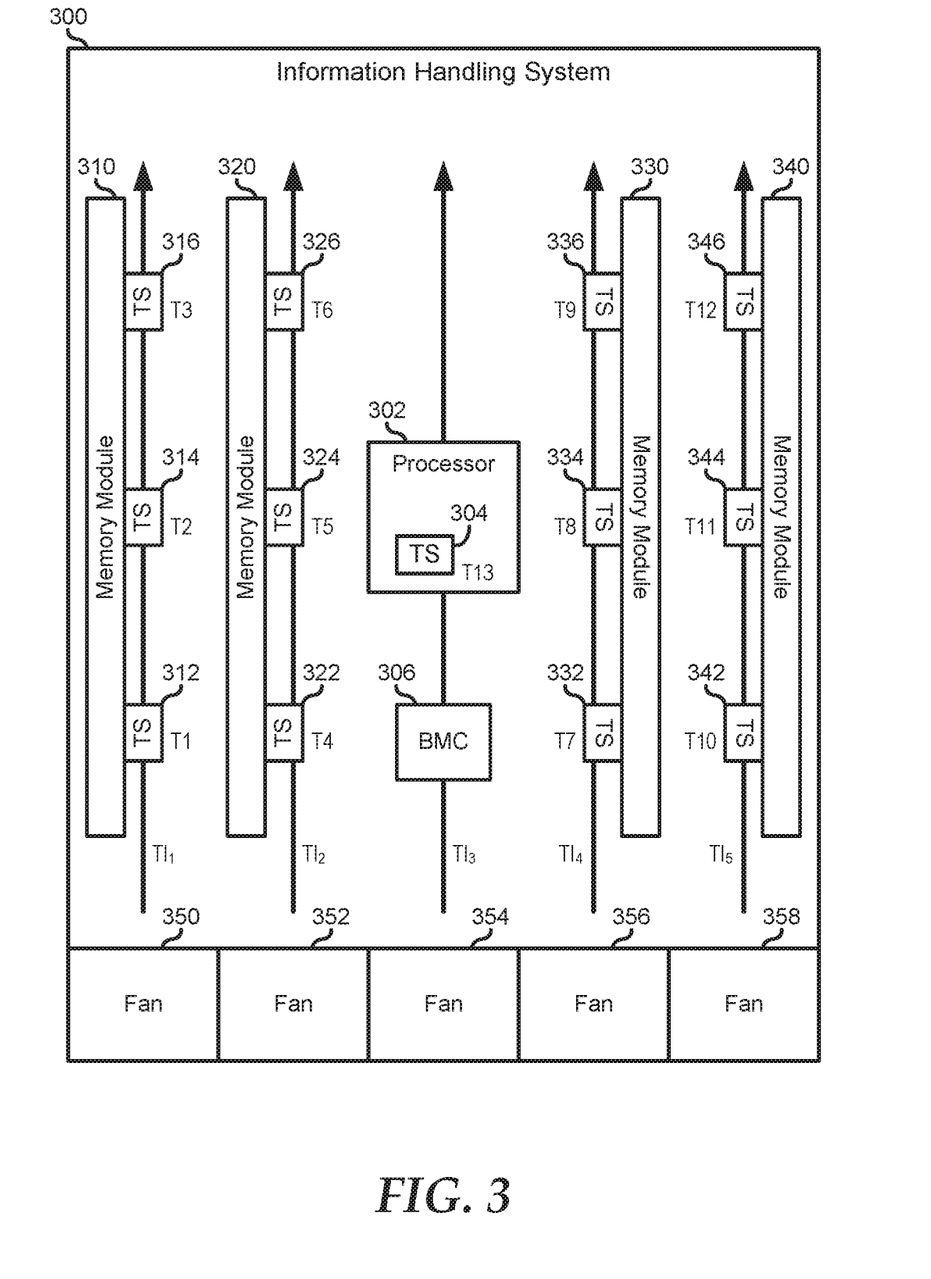
FIG. 3 is a layout of an information handling system according to an embodiment of the present disclosure.

FIG. 3 illustrates layout of an information handling system 300 including a processor 302, a BMC 306, memory modules 310, 320, 330, and 340, and fans 350, 352, 354, 356, and 358. Memory module 310 includes temperature sensors 312, 314, and 316, memory module 320 includes temperature sensors 322, 324, and 326, memory module 330 includes temperature sensors 332, 334, and 336, and memory module 340 includes temperature sensors 342, 344, and 346. Information handling system 300 is similar to information handling system 200. In particular, processor 302 may be connected via an interface to BMC 306, and via one or more high-speed data links or memory controllers to memory modules 310, 320, 330, and 340. Further, BMC 306 may be connected to temperature sensors 312-316, 322-326, 332-336, and 342-346 via a sideband interface to obtain thermal telemetry data from the temperature sensors. Processor 302 includes a temperature sensor 304, and BMC 306 may be connected to the temperature sensor to receive thermal telemetry data from the temperature sensor. BMC 306 is connected to fans 350-358 to control the fan speed of each fan to maintain operating temperatures in various fan zones of information handling system 100 at or below various temperature limits.

A server system will typically include two or more processors that each may support multiple memory modules. For example, a typical server may include two processors and each processor may support eight or more memory modules. Here, a typical layout may place a processor with eight memory modules in parallel with each other and perpendicular to the air flow within the server, with four of the memory modules on each side of the processor. Then the layout will repeat the configuration with the second processor. In another typical layout, four processors may be laid out two pairs of processors laid out with the sixteen memory modules associated with each pair of processors configured similarly to the two-processor server described above. Then, a second pair of processors are similarly laid out with their associated sixteen memory modules down stream in the air flow from the first pair of processors. In both the two-processor configuration and the four-processor configuration, the memory modules and the processors will effectively channel the air flow in the server across the entire width of the associated server chassis.

In a particular embodiment, BMC 306 correlates the thermal telemetry data for a particular memory module 310, 320, 330, or 340 with power information provided by the particular memory module to determine the case-to-ambient thermal resistance ($\Theta_{CA}$) for each memory module, and also for each section (that is upstream section, middle section, and downstream section) of the memory module. For example, considering memory module 310, BMC 306 can obtain per channel power information and the overall power information. Then BMC 306 can determine the thermal resistance for the upstream section by dividing the change in temperature at temperature sensor 312, that is, the temperature information at the temperature sensor less the inlet temperature (T1–$TI_1$), by the upstream channel power to derive the thermal resistance at the upstream section of memory module 310. Similarly, BMC 306 can determine the thermal resistance for the middle section by dividing the change in temperature at temperature sensor 314, that is, the temperature information at the temperature sensor less the temperature information from temperature sensor 312 (T2–T1), by the middle section power to derive the thermal resistance at the middle section of memory module 310. Here BMC 306 can determine the power consumption of the middle section of memory module 310 by subtracting the per channel power information for the upstream and downstream channels from total power information for the memory module. Finally, BMC 306 can determine the thermal resistance for the downstream section by dividing the change in temperature at temperature sensor 316, that is, the temperature information at the temperature sensor less the temperature information from temperature sensor 314 (T3–T2), by the downstream channel power derive the thermal resistance at the downstream section of the memory module. BMC 306 can determine the thermal resistance at all of the thermal sensors in a similar way. In another example, BMC 306 operates to determine a single per-memory module thermal resistance using the highest temperature of the temperature sensors in a particular zone, rather than determining multiple thermal resistances per memory module. In an other example, BMC 306 operates to determine a single per-memory module thermal resistance using the average temperature of the temperature sensors in a particular zone, rather than determining multiple thermal resistances per memory module.

BMC 306 operates to correlate the thermal telemetry data for each memory module in information handling system 300. BMC 306 also correlates thermal telemetry data from temperature sensor 304 in processor 302 with power information provided by the processor to determine the case-to-ambient thermal resistance ($\Theta_{CA}$) for each processor in information handling system 300. Then, combining characterization information from the design of information handling system 300, BMC 306 determines a characteristic air flow map across the width of the chassis of the information handling system. In particular, when the real-time thermal resistances are determined for each zone, the real time thermal resistances can be compared with air flow curves stored in BMC 306 to determine whether or not the real-time air flow in information handling system 300 is behaving in accordance with the expectation from the stored air flow curves. In this way, BMC 306 determines a real-time air flow map for information handling system 300 based upon the comparison of the real-time thermal resistances with the stored air flow curves. Further, once the real-time air flow map is created, anomalies can be identified, such as dead zones or hot spots resulting from lower than expected air flow through a zone. Finally, BMC 306 operates to mitigate the identified anomalies, for example by increasing the fan speed of one or more of fans 350-356.

In a particular embodiment, BMC 306 operates to detect localized or system level air flow recirculation issues in information handling system 300. In particular, BMC 306 operates to detect when one or more of fans 350-358 are providing insufficient airflow volumes to ensure that the airflow in each fan zone does not reverse direction. When air flow recirculation is detected, BMC 306 operates to direct the particular fan 350-358 to increase its speed to increase the air flow volume in order to correct the air flow recirculation. In particular, BMC 306 operates to detect the temperatures from temperature sensors 312-316, 322-326, 332-336, and 342-346, and, for each one of memory modules 310, 320, 330, and 340, to determine if the temperatures upstream in the air flow are lower than the corresponding downstream temperatures. For example, BMC 306 can compare T1 at temperature sensor 312 with T2 at temperature sensor 314, and with T3 at temperature sensor 316.

If T1<T2<T3, then the air flow over memory module 310 is flowing in the correct direction, and no action may need to be taken to maintain proper air flows. On the other hand, if T1>T2>T3, then the air flow over memory module 310 is flowing backward, indicating a recirculation condition in the fan zone associated with the memory module. In this case, BMC 306 may direct fan 350 to increase its speed to overcome the recirculation condition. BMC 306 operates to detect air flow recirculation issues for each of memory modules 310, 320, 330, and 340, and also to detect larger regional air flow recirculation issues that affect two or more of the memory modules. BMC 306 may further operate to detect air flow recirculation issues for processor 302 by comparing the temperature T13 at temperature sensor 304 with the temperature at another location within the fan zone associated with the processor. When two or more fan zones are detected to be experiencing air flow recirculation issues, BMC 306 operates to provide an indication to a management system associated with a data center that includes information handling system 300. In particular, two or more fan zones experiencing air flow recirculation issues may be an indication of a cable or other obstruction blocking the air flow in the particular fan zones.

Figure 4:
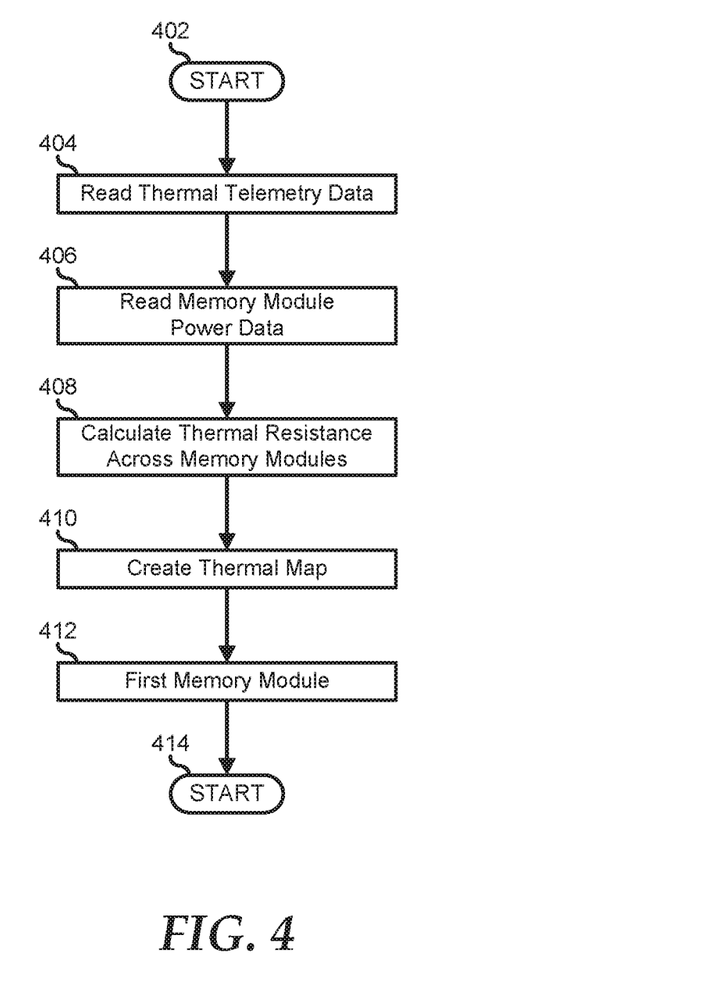
FIG. 4 is a flowchart illustrating a method for creating an air flow map in an information handling system according to an embodiment of the present disclosure.

FIG. 4 illustrates a method for creating an air flow map and detecting air recirculation in an information handling system starting at block 402. Thermal telemetry data is read from temperature sensors at two or more temperature sensors on memory modules in an information handling system in block 404. Power data, including total power data and per-channel power data is read the memory modules in block 406. The thermal resistance for the thermal regions of the memory modules is determined in block 408. The thermal resistances can be determine as multiple thermal resistances on each memory module, one for each section of a memory module, or as a single thermal resistance for each memory module, where the thermal resistance is determined based upon a highest temperature or based upon an average of the temperatures, as described above. A thermal map of the information handling system is created based upon the thermal resistance information in block 410. For example, the real-time thermal resistances can be compared to a stored air flow map based upon characterizations of the information handling system. Anomalies in the real-time air flow are determined based upon the real-time air flow map in block 412, the anomalies are mitigated in block 414, and the method ends in block 416.

Figure 5:
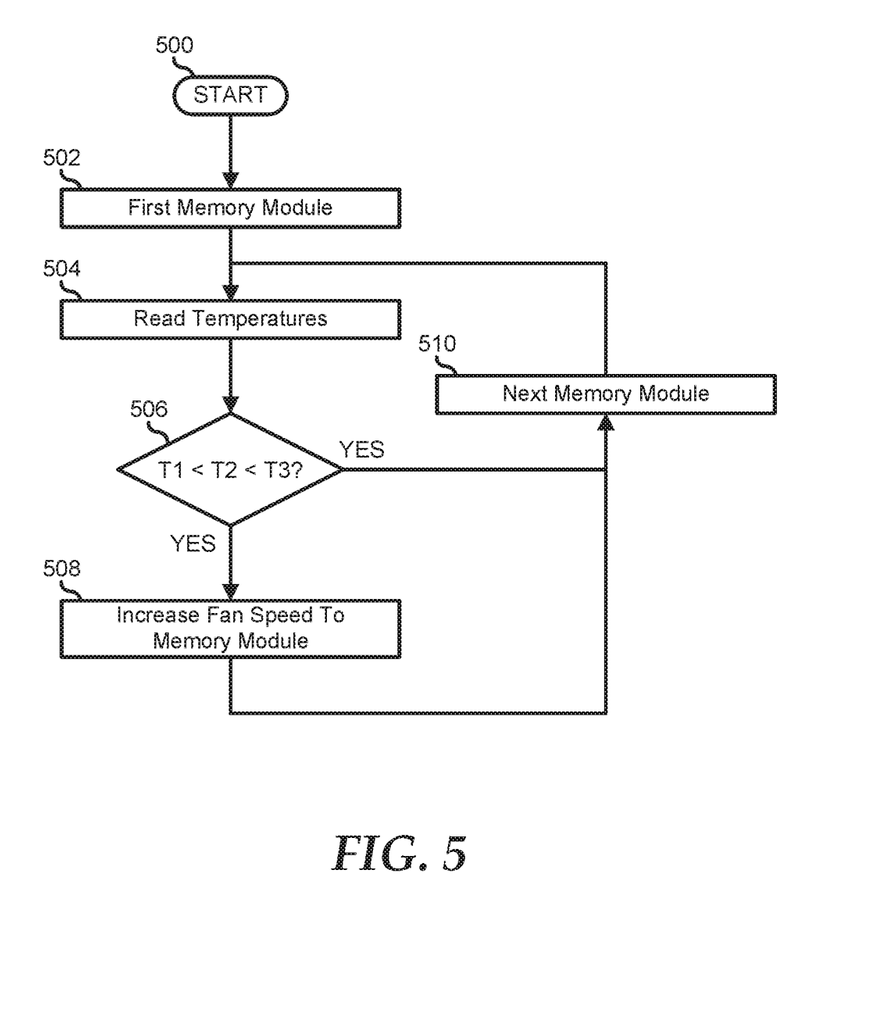
FIG. 5 is a flowchart illustrating a method for detecting air recirculation in an information handling system according to an embodiment of the present disclosure.

FIG. 5 illustrates a method for detecting air recirculation in an information handling system starting at block 500. A first memory module is selected in block 502. The temperatures of the temperature sensors across the memory module are read in block 504. A decision is made as to whether or not a first temperature (T1) at a temperature sensor that is located upstream in the normal air flow is less than a second temperature (T2) at a temperature sensor that is located in the middle of the memory module, and whether or not the second temperature (T2) is less than a third temperature (T3) at a temperature sensor that is located downstream in the normal air flow (T1<T2<T3) in decision block 506. If so, the "YES" branch of decision block 506 is taken, normal air flow is detected, the next memory module is selected in block 508 and the method returns to block 504 where the temperatures of the temperature sensors across the memory module are read. If T1 is greater than T2 or T3, or T2 is greater than T3, the "NO" branch of decision block 506 is taken, recirculating air flow is detected, and the fan speed for the memory module is increased to reverse the recirculating air flow in block 508. The next memory module is selected in block 510 and the method returns to block 504 where the temperatures of the temperature sensors across the memory module are read.

Figure 6:
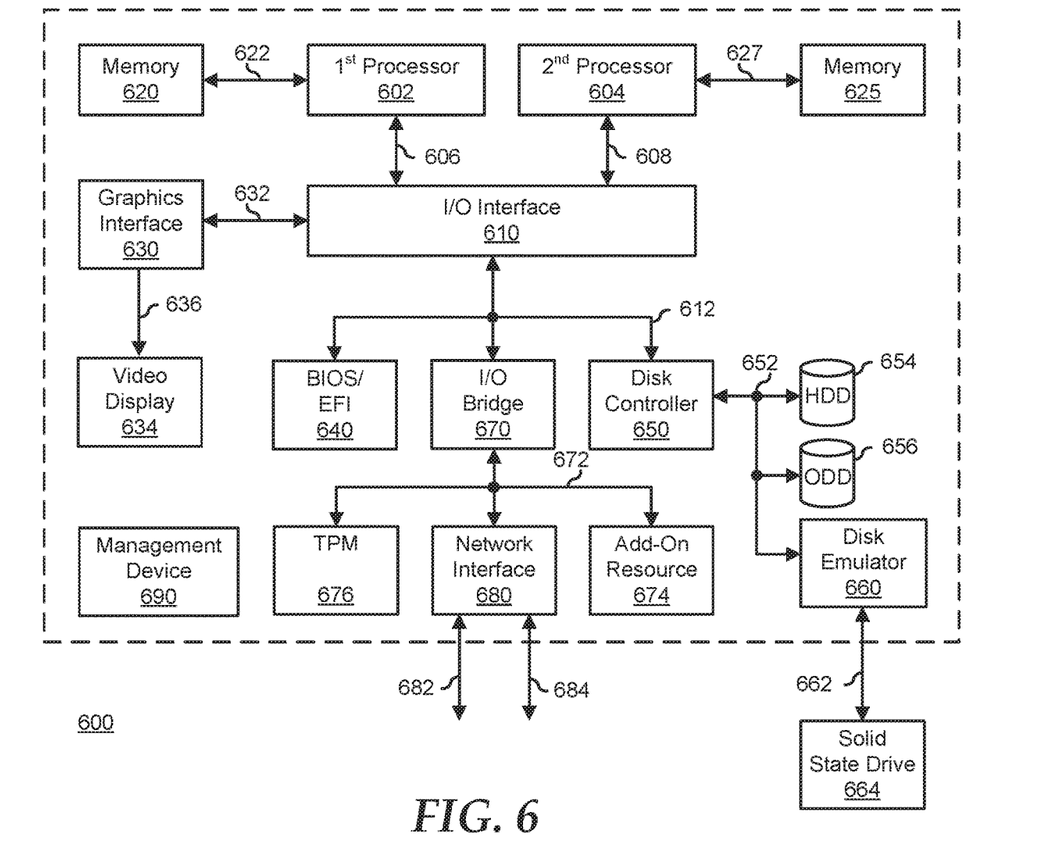
FIG. 6 is a block diagram illustrating an information handling system according to another embodiment of the present disclosure.

FIG. 6 illustrates a generalized embodiment of an information handling system 600 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. An information handling system, comprising:
  an ambient temperature sensor;
  a memory module including a first temperature sensor collocated with first memory devices associated with a first memory channel, and a second temperature sensor collocated with second memory devices associated with a second memory channel; and
  a processor configured to:
    receive an ambient temperature from the ambient temperature sensor;
    receive a first temperature from the first temperature sensor and a second temperature from the second temperature sensor;
    receive a first power level associated with the first memory channel and a second power level associated with the second memory channel from the memory module;
    determine a first thermal resistance of the first memory devices based upon the ambient temperature, the first temperature, and the first power level; and
    determine a second thermal resistance of the second memory device based upon the first temperature, the second temperature, and the second power level.

2. The information handling system of claim 1, wherein:
in determining the first thermal resistance, the processor is further configured to divide a difference of the ambient temperature and the first temperature by the first power level; and
in determining the second thermal resistance, the processor is further configured to divide a difference of the first temperature and the second temperature by the second power level.

3. The information handling system of claim 2, wherein the memory module further includes a third temperature sensor located between the first and second temperature sensors.

4. The information handling system of claim 3, wherein the processor is further configured to:
receive a third temperature from the third temperature sensor;
receive a third power level from the memory module, the third power level being a total power level of the memory module; and
determine a third thermal resistance of the memory module based upon the first temperature, the third temperature and the third power level.

5. The information handling system of claim 4, wherein in determining the third thermal resistance, the processor is further configured to:
determine a fourth power level associated with the memory module, the fourth power level being the difference between the third power level and the sum of the first and second power levels; and
divide a temperature difference between the first temperature and the third temperature by the fourth power level.

6. The information handling system of claim 5, wherein the processor is further configured to:
produce an air flow map of the information handling system based upon the first thermal resistance, the second thermal resistance, and the third thermal resistance.

7. The information handling system of claim 1, wherein:
the first memory devices are located upstream in an expected air flow provided across the memory module and the second memory devices are located downstream in the expected air flow;
the processor is further configured to:
determine whether or not an actual air flow provided across the memory module is in an opposite direction as the expected air flow; and
increase a fan speed to reverse the direction of the actual air flow when the actual air flow is in the opposite direction.

8. The information handling system of claim 7, wherein in determining whether or not the actual air flow is in the opposite direction, the processor is further configured to:
determine that the first temperature is greater than the second temperature.

9. The information handling system of claim 1, wherein the memory module is a Dual Data Rate-5 Dual In-Line Memory Module (DDR5 DIMM).

10. A method, comprising:
providing, on a memory module of an information handling system, a first temperature sensor collocated with first memory devices associated with a first memory channel, and a second temperature sensor collocated with second memory devices associated with a second memory channel;
receiving, by a processor of the information handling system, a first temperature from the first temperature sensor and a second temperature from the second temperature sensor;
receiving, by the processor, a first power level associated with the first memory channel and a second power level associated with the second memory channel from the memory module;
calculating a first thermal resistance of the first memory devices based upon the first temperature and the first power level; and
calculating a second thermal resistance of the second memory device based upon the second temperature and the second power level.

11. The method of claim 10, wherein:
in calculating the first thermal resistance, the method further comprises dividing the first temperature by the first power level; and
in calculating the second thermal resistance, the method further comprises dividing the second temperature by the second power level.

12. The method of claim 11, wherein the memory module further includes a third temperature sensor located between the first and second temperature sensors.

13. The method of claim 12, further comprising:
receiving, by the processor, a third temperature from the third temperature sensor;
receiving, by the processor, a third power level from the memory module, the third power level being a total power level of the memory module; and
calculating, by the processor, a third thermal resistance of the memory module based upon the third temperature and the third power level.

14. The method of claim 13, wherein in calculating the third thermal resistance, the method further comprises:
determining a fourth power level associated with the memory module, the fourth power level being the difference between the third power level and the sum of the first and second power levels; and
dividing the third temperature by the fourth power level.

15. The method of claim 14, further comprising producing an air flow map of the information handling system based upon the first thermal resistance, the second thermal resistance, and the third thermal resistance.

16. The method of claim 10, wherein:
the first memory devices are located upstream in an expected air flow provided across the memory module and the second memory devices are located downstream in the expected air flow;
the method further comprises:
determining, by the processor, whether or not an actual air flow provided across the memory module is in an opposite direction as the expected air flow; and
increasing a fan speed to reverse the direction of the actual air flow when the actual air flow is in the opposite direction.

17. The method of claim 16, wherein in determining whether or not the actual air flow is in the opposite direction, the method further comprises:
determining that the first temperature is greater than the second temperature.

18. The method of claim 10, wherein the memory module is a Dual Data Rate-5 Dual In-Line Memory Module.

19. An information handling system, comprising:
a first memory module including a first temperature sensor collocated with first memory devices associated with a first memory channel, and a second temperature sensor collocated with second memory devices associated with a second memory channel;

a second memory module including a third temperature sensor collocated with third memory devices associated with a third memory channel, and a fourth temperature sensor collocated with fourth memory devices associated with a fourth memory channel; and a processor configured to:

receive a first temperature from the first temperature sensor, a second temperature from the second temperature sensor, a third temperature from the third temperature sensor, and a fourth temperature from the fourth temperature sensor;

receive a first power level associated with the first memory channel, and a second power level associated with the second memory channel from the first memory module;

receive a third power level associated with the third memory channel, and a fourth power level associated with the fourth memory channel from the second memory module;

determine a first thermal resistance of the first memory devices based upon the first temperature and the first power level;

determine a second thermal resistance of the second memory device based upon the second temperature and the second power level;

determine a third thermal resistance of the third memory devices based upon the third temperature and the third power level;

determine a fourth thermal resistance of the fourth memory device based upon the fourth temperature and the fourth power level; and produce an air flow map of the information handling system based upon the first thermal resistance, the second thermal resistance, the third thermal resistance, and the fourth thermal resistance.

20. The information handling system of claim 19, wherein the first and second memory modules are Dual Data Rate-5 Dual In-Line Memory Modules.

\* \* \* \* \*